US012561773B2

(12) United States Patent
Li et al.

(10) Patent No.: US 12,561,773 B2
(45) Date of Patent: Feb. 24, 2026

(54) METHOD AND APPARATUS FOR PROCESSING IMAGE, ELECTRONIC DEVICE, CHIP AND MEDIUM

(71) Applicant: Beijing X-Ring Technology Co., Ltd., Beijing (CN)

(72) Inventors: Wangqi Li, Shanhai (CN); Yuelei Liu, Shanghai (CN)

(73) Assignee: Beijing X-Ring Technology Co., Ltd., Beijing (CN)

( * ) Notice: Subject to any disclaimer, the term of this patent is extended or adjusted under 35 U.S.C. 154(b) by 334 days.

(21) Appl. No.: 18/216,545

(22) Filed: Jun. 29, 2023

(65) Prior Publication Data

US 2024/0303791 A1 Sep. 12, 2024

(30) Foreign Application Priority Data

Mar. 10, 2023 (CN) .......................... 202310233192.X

(51) Int. Cl.
| | |
|---|---|
| *H04N 19/85* | (2014.01) |
| *G06T 5/40* | (2006.01) |
| *G06T 5/92* | (2024.01) |

(52) U.S. Cl.
CPC .................. *G06T 5/92* (2024.01); *G06T 5/40* (2013.01); *G06T 2207/10016* (2013.01); *G06T 2207/10024* (2013.01); *G06T 2207/20208* (2013.01)

(58) Field of Classification Search
CPC ... G06T 5/92; G06T 5/40; G06T 2207/10016; G06T 2207/10024; G06T 2207/20208; H04N 19/85; H04N 19/98; H04N 19/42; H04N 19/86
See application file for complete search history.

(56) References Cited

U.S. PATENT DOCUMENTS

| | | | |
|---|---|---|---|
| 10,863,457 B2 | 12/2020 | Jung et al. | |
| 2014/0101485 A1* | 4/2014 | Wegener | H03M 7/3079 |
| | | | 714/E11.178 |
| 2017/0289571 A1* | 10/2017 | El Mezeni | H04N 19/186 |
| 2018/0278967 A1* | 9/2018 | Kerofsky | H04N 19/98 |
| 2022/0108429 A1* | 4/2022 | Li | H04N 19/154 |

FOREIGN PATENT DOCUMENTS

WO WO 2022076125 A1 4/2022

OTHER PUBLICATIONS

European Patent Application No. 23186405.9 Search and Opinion Dec. 21, 2023, 11 pages.

* cited by examiner

*Primary Examiner* — Oneal R Mistry
*Assistant Examiner* — Rachel L Roberts
(74) *Attorney, Agent, or Firm* — Cozen O'Connor

(57) ABSTRACT

In a method for processing an image, statistical information is obtained by performing histogram statistics on an image frame included in a video sequence. An overall compression ratio of the image frame and mid luminance information of the image frame are obtained based on the statistical information. A compression curve is obtained based on the overall compression ratio and the mid luminance information. Dynamic range compression is performed on the image frame by adjusting a shape of the compression curve based on the overall compression ratio, the mid luminance information and adjustment ratios.

13 Claims, 10 Drawing Sheets

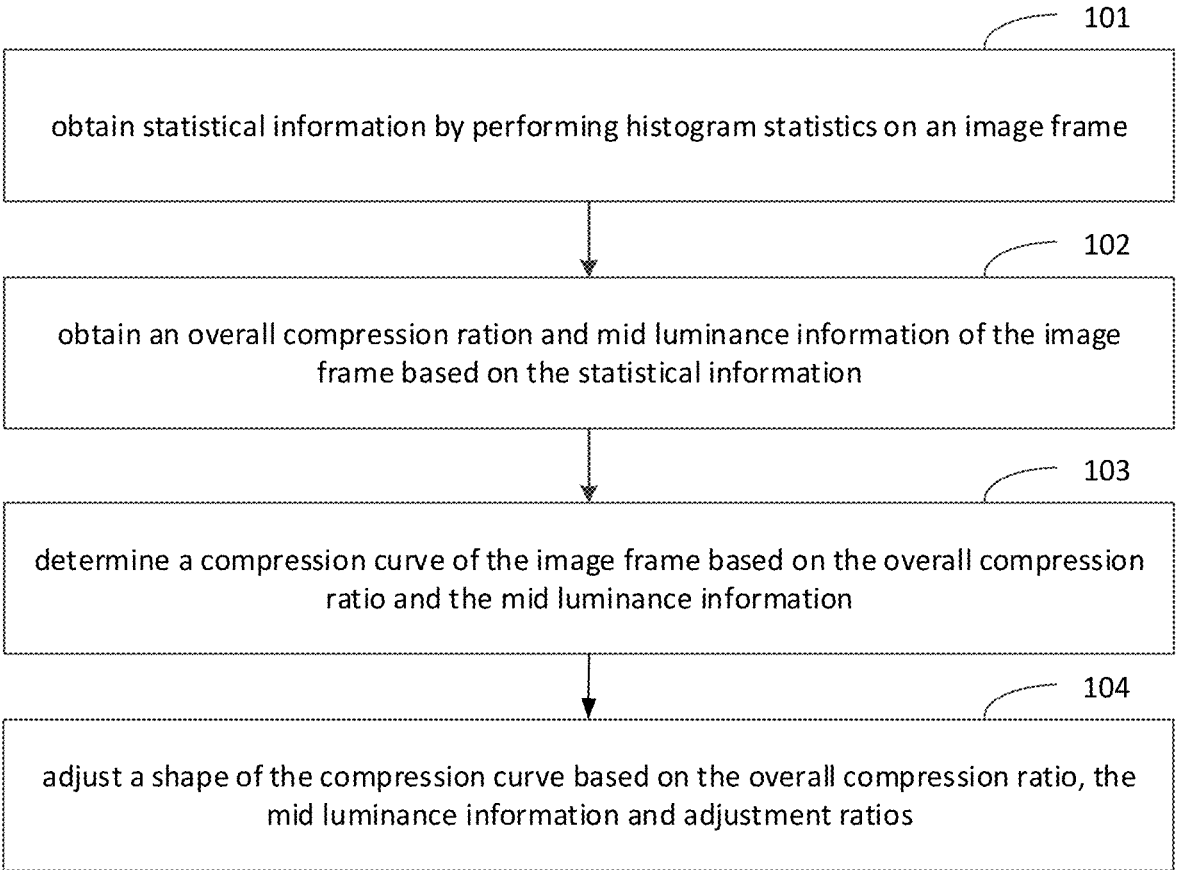

101 obtain statistical information by performing histogram statistics on an image frame

102 obtain an overall compression ration and mid luminance information of the image frame based on the statistical information

103 determine a compression curve of the image frame based on the overall compression ratio and the mid luminance information

104 adjust a shape of the compression curve based on the overall compression ratio, the mid luminance information and adjustment ratios

FIG. 1

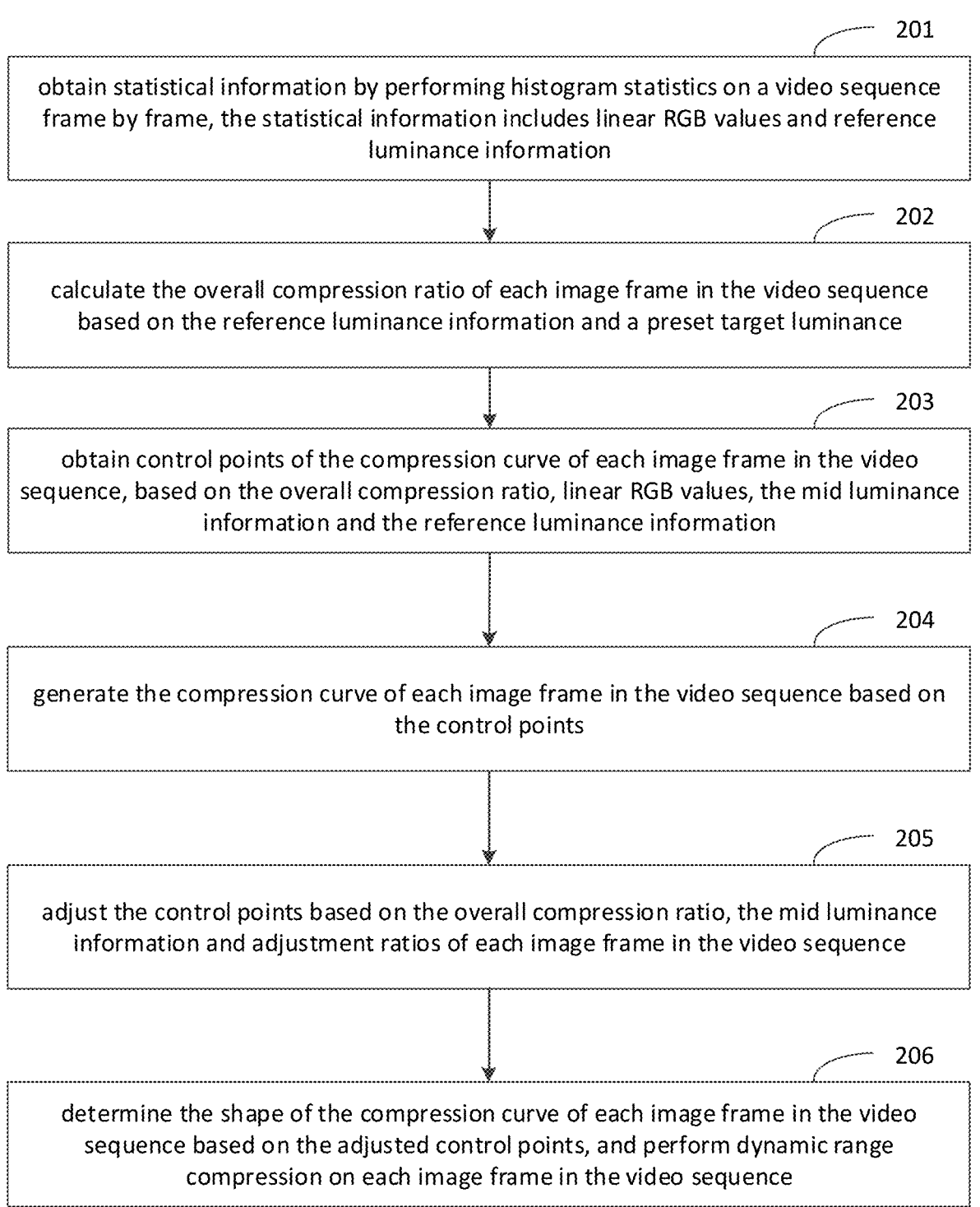

201 obtain statistical information by performing histogram statistics on a video sequence frame by frame, the statistical information includes linear RGB values and reference luminance information

202 calculate the overall compression ratio of each image frame in the video sequence based on the reference luminance information and a preset target luminance

203 obtain control points of the compression curve of each image frame in the video sequence, based on the overall compression ratio, linear RGB values, the mid luminance information and the reference luminance information

204 generate the compression curve of each image frame in the video sequence based on the control points

205 adjust the control points based on the overall compression ratio, the mid luminance information and adjustment ratios of each image frame in the video sequence

206 determine the shape of the compression curve of each image frame in the video sequence based on the adjusted control points, and perform dynamic range compression on each image frame in the video sequence

FIG. 2 recal anchor2 recal anchor1

METHOD AND APPARATUS FOR PROCESSING IMAGE, ELECTRONIC DEVICE, CHIP AND MEDIUM

CROSS REFERENCE TO RELATED APPLICATIONS

This application claims priority and benefits to Chinese Application No. 202310233192.X, filed on Mar. 10, 2023, the entire content of which is incorporated herein by reference.

TECHNICAL FIELD

The disclosure relates to a field of digital image processing technologies, in particular to a method for processing an image, an apparatus for processing an image, an electronic device, a chip and a medium.

BACKGROUND

With the development of technology, people are demanding higher image quality. High Dynamic Range (HDR) has become one of the most popular developments in the viewing experience. True HDR combines high resolution (typically 4K+8K), the HDR, and wide color gamut (Rec2020). To enhance the viewing experience, various display devices focus on improving the ability to represent the brightness, the darkness and color ranges, especially the bright and dark details, thereby improving the reality sense.

SUMMARY

A first aspect of embodiments of the disclosure provides a method for processing an image. The method includes: for each image frame included in a video sequence, obtaining statistical information by performing histogram statistics on an image frame; determining an overall compression ratio of the image frame and mid luminance information of the image frame based on the statistical information; obtaining a compression curve based on the overall compression ratio and the mid luminance information; and performing dynamic range compression on the image frame by adjusting a shape of the compression curve based on the overall compression ratio, the mid luminance information and adjustment ratios.

A second aspect of embodiments of the disclosure provides an electronic device. The electronic device includes: at least one processor, and a memory communicatively connected to the at least one processor. The memory stores instructions executable by the at least one processor, and when the instructions are executed by the at least one processor, the at least one processor is caused to implement the method according to embodiments of the first aspect of the disclosure.

A third aspect of the embodiments of the disclosure provides a non-transitory computer-readable storage medium having computer instructions stored thereon. The computer instructions are configured to cause a computer to implement the method according to embodiments of the first aspect of the disclosure.

It is understandable that the above general description and the following detailed descriptions are illustrative and explanatory only and do not limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure, and do not constitute an undue limitation of the disclosure.

FIG. 1 is a flowchart illustrating a method for processing an image according to embodiments of the disclosure.

FIG. 2 is a flowchart illustrating a method for processing an image according to embodiments of the disclosure.

DETAILED DESCRIPTION

Figure 3:
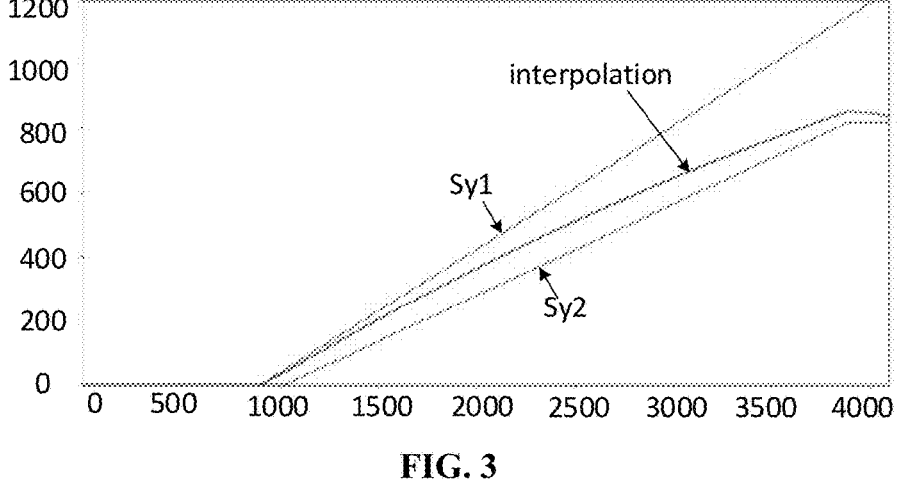
FIG. 3 is a schematic diagram illustrating an interpolation result according to embodiments of the disclosure.

Embodiments of the disclosure are described in detail below, and examples of the embodiments are shown in the accompanying drawings, in which the same or similar numbers indicate the same or similar components or components having the same or similar functions. The embodiments described below with reference to the accompanying drawings are examples, and are intended to be used to explain the disclosure and are not to be construed as limiting the disclosure.

With the development of technology, people are demanding higher image quality. Increased image resolution and higher video frame rate are key features of ultra-high definition video. However, these features by themselves cannot enable an image to cover the full range of luminance information visible to the human eyes. High dynamic range (HDR) has become one of the most popular developments in the viewing experience. True HDR means high resolution (typically 4K+8K), high dynamic range and wide color gamut (Rec2020). To enhance the viewing experience, various display devices focus on improving the ability of representing luminance, darkness and color ranges, especially the bright and dark details, thereby improving the sense of reality.

In detail, there are mainly two solutions in the related art. The first solution is HDR10 dynamic range compression based on static metadata. Static dynamic range compression curve is proposed in the HDR10 standard by the Blu-ray Disc Association. The HDR10 transfers the dynamic range mapping information of the video through the static metadata. The amount of transferred information is relatively small, in which the highest luminance information of frames in the video sequence is mainly used to calculate the dynamic range compression ratio. The highest luminance is used as the source luminance and the real-time display luminance of the display is used as the target luminance to perform the dynamic range compression, to achieve a good display effect on the display. The second solution is the HDR-standard Hybrid Log-Gamma (HLG) that is jointly developed by the BBC and the NHK. The HLG defines a nonlinear Optical-Electro Transfer Function (OETF), in which the lower half of the signal value uses a gamma curve compatible with SDR, while the upper half of the signal value uses a logarithmic curve based on Weber's law. It uses the same relative luminance system as the existing display device. The display luminance is not only related to the signal level, but also related to the display device. The highest level of the signal corresponds to the highest luminance of the display device, so that the relative luminance can be transferred taking into account of the display capability of the display device, and can be displayed on any display of any luminance without metadata.

However, since the first solution uses the highest luminance information in the video sequence as the source luminance information of the dynamic range compression of the whole video sequence, the overall compression ratio of the video sequence cannot be changed. In a video with drastic changes in luminance, due to the constant compression ratio, ideal frame compression effect can be achieved only for bright frames, while dark frames may be darker due to the improper compression ratio, which brings a bad visual impression. The second solution uses a transfer function to transfer the relative luminance information, which essentially does a linear dynamic range compression at the display side. On the one hand, the control of the dynamic range is not fine enough, and on the other hand, since the coding efficiency of HLG is smaller than that of the transfer function PQ used in the disclosure, the dynamic range transfer loss is higher.

As can be seen that in the related art, since the absolute luminance encoded by the common transfer function for the HDR (e.g., the PQ function) is beyond the current display capability and the compression ratio of HDR imaging processing is constant, a huge difference in HDR between different display devices and unsatisfactory dynamic compression effect are caused, and the visual perception is poor.

In order to solve the problems existing in the related art, the disclosure provides a method for processing an image. The method includes: obtaining statistical information by performing, frame by frame, histogram statistics on a video sequence; obtaining a compression curve and an overall compression ratio of each image frame in the video sequence based on the statistical information; and performing dynamic range compression on each image frame in the video sequence by adjusting a shape of the compression curve based on the overall compression ratio. The shape of the compression curve can be adjusted adaptively according to each image frame in the video sequence, so as to transfer the dynamic range information of the whole image and ensure that each image frame can better represent the bright and dark detail information.

The method according to the disclosure is mainly applied to a digital image processing stage in the field of cell phone video recording or industrial camera imaging, which is not limited in embodiments of this disclosure.

The method for processing an image according to the disclosure will be described in detail below in combination with the accompanying drawings.

FIG. 1 is a flowchart illustrating a method for processing an image according to embodiments of the disclosure. As shown in FIG. 1, the method includes blocks 101-103. The methods described in the disclosure can be applied to each image frame included in a video sequence.

At block 101, statistical information is obtained by performing histogram statistics on an image frame.

In embodiments of the disclosure, the histogram statistics is performed frame by frame on the video sequence based on a size for displaying. Or, an upsampling operation is performed on the video sequence at an appropriate rate based on a size for displaying and then the histogram statistics is performed frame by frame on the upsampled video sequence. The video sequence includes multiple image frames and each image frame has respective statistical information. The statistical information includes linear RGB (red, green, blue) values and the reference luminance information.

In detail, performing the histogram statistics means performing a statistics processing on a maximum value (also called a maximum RGB value, a maxRGB value, or a MaxRGB value) among the RGB values of each pixel point and the non-linear domain luminance in each image frame in the video sequence, to obtain linear RGB values and the reference luminance information of each image frame in the video sequence. The histogram statistics is performed based on a coarse granularity. The granularity means a size spanned by a bin of the histogram. The larger the size spanned by a bin is, the more the image information covered by coarse granularity is.

At block 102, an overall compression ratio and mid luminance information of the image frame are obtained based on the statistical information.

In embodiment of the disclosure, the respective overall compression ratio of each image frame and respective mid luminance information of each image frame are obtained based on the statistical information of each image frame.

The mid luminance information means the luminance information near the middle part of the luminance histogram, which is usually the luminance range of the whole image to which the human eyes pay most attention. The compression curve is for example a ToneMapping curve. The ToneMapping is used to map the color from an original luminance (usually the HDR) to a target luminance (usually the Low Dynamic Range (LDR)). The mapping result is displayed through a medium, to achieve the effect of restoring the original scene as much as possible under the action of the visual properties of the human eyes.

At block 103, a compression curve of the image frame is determined based on the overall compression ratio and the mid luminance information.

Based on the overall compression ratio and the mid luminance information, control points (including anchor points and a knee point) are obtained. Then, respective values of the control points are obtained through a linear interpolation of the statistical information, to determine the compression curve. The process of determining the compression curve will be described below.

At block 104, a shape of the compression curve is adjusted based on the overall compression ratio, the mid luminance information and adjustment ratios.

The dynamic range compression is performed on each image frame in the video sequence by adjusting a shape of the compression curve based on the overall compression ratio, the mid luminance information and the adjustment ratios.

In embodiments of the disclosure, the control points are adjusted according to the overall compression ratio, the mid luminance information and the adjustment ratios. The shape of the compression curve of each image frame is determined according to the adjusted control points, to achieve the dynamic range compression of the image frame. The compression ratio is obtained based on the statistical information and a preset target luminance.

In the disclosure, the compression curve is a combination of a straight line and a high-order Bezier curve. The Bezier curve is a mathematical curve mainly used in a two-dimensional (2D) graphics application. The curve is determined by a start point, an end point and the control points (also called anchor points). By adjusting the control points, the shape of the Bezier curve may change.

In conclusion, with the method for processing an image according to the disclosure, the statistical information is obtained by performing the histogram statistics on the video sequence frame by frame. The compression curve is obtained based on the overall compression ratio and the mid luminance information of each image frame in the video sequence that are obtained based on the statistical information. The dynamic range compression is performed on each image frame in the video sequence by adjusting the shape of the compression curve based on the overall compression ratio and the mid luminance information. Therefore, the shape of the compression curve can be adjusted adaptively according to each image frame in the video sequence, to better transfer the dynamic range information of the entire video and ensure that each image frame can well represent the bright and dark detail information.

Based on the embodiments illustrated in FIG. 1, FIG. 2 is a flowchart illustrating a method for processing an image according to embodiments of the disclosure. The blocks 102, 103 and 104 are further defined based on the embodiments of FIG. 1. As illustrated in FIG. 2, the method includes the following.

At block 201, statistical information is obtained by performing histogram statistics on a video sequence frame by frame. The statistical information includes linear RGB values and reference luminance information.

In embodiments of the disclosure, in order to improve the efficiency of performing the statistics, the statistics is performed in a nonlinear domain that is obtained after performing a gamma processing. By smoothing the respective histogram of each image frame in the video sequence, the maximum RGB value of each pixel point and the nonlinear domain luminance in each image frame in the video sequence are determined. The linear RGB values and the reference luminance information of each image frame in the video sequence are obtained by transferring the maximum RGB value of each pixel point and the non-linear domain luminance into a linear domain and performing a cumulative histogram calculation.

In an example, the statistics involves the maximum RGB value among the pixel value of the R channel, the G channel, and the B channel for each pixel point and the luminance information Y.

The histogram calculated in the nonlinear domain is called histogram 1. The horizontal coordinate of the histogram 1 is the 10 bit (0-1024) commonly used in HDR video encoding. The physical meaning of the horizontal coordinate is the maximum RGB value represented by "maxRGB". The vertical coordinate of the histogram 1 is the number of pixels when the horizontal coordinate is the corresponding maxRGB. In order to stably output the histogram 1 for calculating the dynamic range compression curve and prevent inter-frame luminance flicker, an intra-frame sliding window is introduced in the disclosure, where the size of the window is selected based on some information that comes with the video (e.g. LuxID, etc.) to smooth a respective histogram 1 for each frame, thereby ensuring that there is no sudden change in the luminance of the histogram outputted frame by frame. After smoothing the histogram efficiently, the maxRGB information is transferred to the linear domain, and then the cumulative histogram calculation is performed to obtained the histogram 2 used for the tone compression curve calculation. The histogram 2 is an array that only includes the linear maxRGB values obtained by transferring the maximum RGB values corresponding to the cumulative number of pixels that is 1%, 25%, 50%, 75%, 90%, 95% or 99% of the total number of pixels to the linear domain after the inverse gamma transformation, and the reference luminance information by transferring from the nonlinear domain to the linear domain.

The luminance information Y is the reference luminance information mentioned in this disclosure, and the conversion equation of the statistical luminance Y is related to the color gamut. Taking BT.2020, which is common for the HDR, as an example, for a pixel point, Y' (which is the above-mentioned luminance Y) is calculated through a following conversion equation:

$Y'=0.2627*R'+0.6780*G'+0.0593*B'$, where Y' denotes the luminance after the gamma processing, R' denotes the pixel value of the R channel of a current pixel point, G' denotes the pixel value of the G channel of the current pixel point, and B' denotes the pixel value of the B channel of the current pixel point.

The reference luminance information includes first reference luminance information and second reference luminance information. The first reference luminance information is calculated based on the statistical information of the maxRGB values, such as the luminance range of 99% of pixels. The second reference luminance information is luminance information calculated based on the luminance Y, such as the maximum value among the luminance range of 99.99% of pixels, or an average value of the percentage of pixels whose luminance is less than 100 nit in a scene.

It is understandable that, for the luminance Y, the second reference luminance information is obtained through the same statistical processing as the maxRGB. In other words, both need to be calculated by histogram statistics.

At block 202, the overall compression ratio of each image frame in the video sequence is calculated based on the reference luminance information and a preset target luminance.

In embodiments of the disclosure, the reference luminance information includes a highest luminance of each frame in a video source or a luminance range of each frame in a video source. To avoid the noise interference, the reference luminance information can be set as the luminance value corresponding to 95% or 99% of pixels in the histogram.

It is understandable that according to different compression manners, the first reference luminance information or the second reference luminance information in the reference luminance information can be selected as a reference, to obtain the overall compression ratio and achieve the dynamic range compression.

The overall compression ratio of each frame in the video sequence is obtained based on the highest luminance of the current frame in the video source and the preset target luminance. The preset target luminance is set according to actual luminance parameters of the display device, which is not limited in the disclosure. The reference luminance information is related to whether the statistical information of maxRGB values or the luminance Y is used for compression in the subsequent compression manner, which is expressed as the reference luminance information in this disclosure.

At block 203, control points of the compression curve of each image frame in the video sequence are obtained based on the overall compression ratio, linear RGB values, the mid luminance information and the reference luminance information.

In embodiments of the disclosure, the control points include a knee point, a first anchor point, a second anchor point and at least one third anchor point. The mid luminance information of each image frame in the video sequence is determined based on the linear RGB values of each image frame in the video sequence. Based on the mid luminance information and the overall compression ratio, the knee point of the compression curve of each image frame in the video sequence and a control region of the knee point are determined. The first anchor point of each image frame in the video sequence is determined based on the knee point, the control region of the knee point, and a preset adjustment value. The second anchor point and the at least one third anchor point of each image frame in the video sequence are obtained through an interpolation processing based on the knee point, the mid luminance information, the overall compression ratio and a preset threshold range.

The linear RGB values of each image frame in the video sequence are linear RGB values in the histogram 2. The mid luminance information is the mid-Tone, i.e., the information of a region that is the middle of the luminance of the image. At least one third anchor point may be 7 third anchor points in this disclosure, which is not limited in this disclosure.

In this disclosure, the knee point in the straight line portion can be calculated as follows. The calculation of the knee point controls the range of the linear portion. The linear portion maintains the compression ratio of the preset target luminance (denoted by "targetLum") to the reference luminance information (denoted by "sourceLum"). That is, the linear portion maintains the contrast of the low-light portion unchanged. Therefore, the overall control capability of the range of the linear portion is determined by the vertical coordinates ($K_y$) of the knee point of the straight line portion. In an implementation, two values are used to determine the range of the vertical coordinate ($K_y$) of the knee point, and the $K_y$ is obtained through an interpolation using these two values, where the interpolation ratio is determined by the mid luminance information. On the basis of the result of the histogram statistics, the mid reference information is the maxRGB values corresponding to 50% of the pixels in the histogram statistics. Therefore, the larger the value of the mid reference information, the smaller the range of the linear portion controlled by the vertical coordinate of the knee point of the straight line part is, and the less the region where the contrast is maintained is.

If the target display luminance is the standard HDR, the original maximum luminance is the maximum luminance (e.g., 10000 nit) transferred by the PQ function. After the original maximum luminance is converted to the scale of the preset target luminance which is 1000 nit, the value of the vertical coordinate of the knee point in the straight line part should be maintained within a range of [200 nit, 300 nit] which is acceptable to the SDR display. Meanwhile, the overall compression curve should be a straight line in the extreme case where the reference luminance information is equal to the preset target luminance. That is, if the values of the anchor points of the Bezier curve are:

$$
\vec{P}_L = \begin{pmatrix} 0 \\ \frac{1}{N} \\ \vdots \\ \frac{N-1}{N} \\ 1 \end{pmatrix},
$$

where $\vec{P}_L$ denotes the anchor points of the Bezier curve, N denotes the order of the Bezier curve. In the disclosure, N equals to 9. The first anchor point is 1024/10=102. According to the first-order continuity condition, the vertical coordinate of the knee point in the straight line portion is calculated as 840/4096 (the mid tone is calculated based on the half of the maximum luminance of the video source, i.e., 5000 nit). The interpolation is performed on two folded lines (such as the folded lines "Sy1" and "Sy2" illustrated in FIG. 3) to obtain values of the first anchor point (such as the "interpolation" illustrated in FIG. 3). The finally-obtained interpolation point is correlated to the target luminance, while the interpolation ratio is negatively correlated to the luminance of the mid luminance information. According to the above principles, the interpolation result is illustrated in FIG. 3. Therefore, through the fine design, the luminance of the dark region is ensured while the overall compression curve is a straight line in the extreme case where the target luminance is equal to the original luminance and the vertical coordinate of the knee point in the straight line part satisfies a specific requirement.

In the disclosure, the first anchor point (denoted by "anchor 1") and the second anchor point (denoted by "anchor 2") of the curve are calculated as follows. The slope of the linear portion is determined by the ratio of the preset target luminance to the reference luminance information. Since the contrast is maintained because the luminance of the linear portion is linearly compressed, while the contrast of the compression curve portion is changed, a good visual effect is achieved. There are 9 control points in the compression curve, such that a respective luminance compression ratio in each interval can be determined. As a whole, the locations of the control points are determined by an initial preset compression ratio and left and right ranges together. In order to ensure the smoothness of the intersection region between the linear portion and the curve portion to avoid an artifact, the first-order derivatives at the intersection region between the straight line and the curve need to be the same. Thus, the value of the first anchor point is determined by the following control conditions:

$$
\frac{d}{dt} B_N(t)\bigg|_{t=0} = NP_1
$$
$$
\frac{K_y}{K_x} = \left(\frac{1-K_y}{1-K_x}\right) NP_1 .
$$
$$
P_1 = \frac{K_y(1-K_x)}{NK_x(1-K_y)}
$$

where $B_N$ denotes the Bezier curve, P1 denotes the value of the first anchor point of the Bezier curve.

In detail, since the value of the first anchor point and the value of the second anchor point correspond to the luminance information within an interval between 0 to 3000 nit of 0 to 10000 nit and the luminance information after that interval is the critical luminance information of the whole image, the value of the first anchor point and the value of the second anchor point need to be compressed moderately, to sacrifice the contrast of the image portion corresponding to this interval and enhance the contrast of the subsequent key portions of the image. Therefore, a tune value is set to fine tune the first anchor point while ensuring that the value of the first anchor point cannot exceed a limit, so that there will be no artifact caused by unsmooth transition between the straight line and the curve.

There are two main reasons for adjusting the first anchor point. Firstly, in the case of fixed point, the unsmooth curve should be avoided as much as possible, while meeting the purpose of compressing the first section of the curve. Secondly, it should avoid the abnormal values caused by that the constraint on the first anchor point is not strong enough when the value of the knee point is close to 0.

Figure 4:
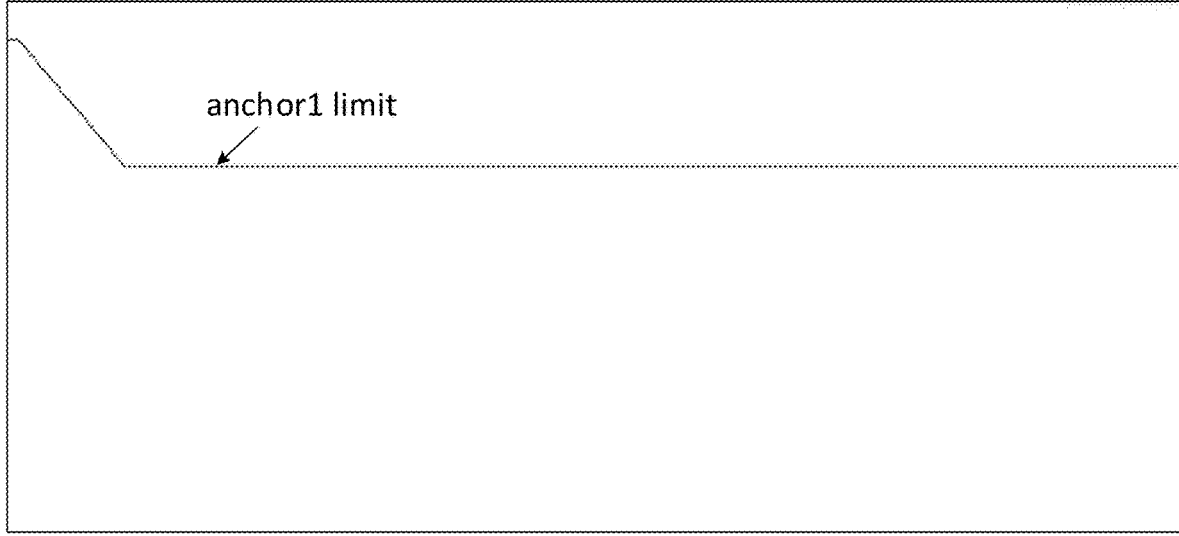
FIG. 4 is a schematic diagram illustrating limits of a first anchor point according to embodiments of the disclosure.

Since the first anchor point determines the first section of the curve which is directly connected with the straight line portion, the upper limit of the change of the first anchor point is determined by the value of the vertical coordinate of the knee point of the straight line portion. The relation between the upper limit and the value of the vertical coordinate of the knee point of the straight line portion is illustrated in FIG. 4. The smaller the range of a first section of straight line (not shown in FIG. 4) of the compression curve that is controlled by an initial first control point, the smaller the range of the change of the first control point. Meanwhile, it is necessary to ensure that there is at least a limitation on the first anchor point when the vertical coordinate of the knee point of the straight line portion is 0 or close to 0. The knee point is set to be 100 nit, which is a common SDR luminance level. This kind of adjustment is mainly used in a large dynamic range compression scene, while the tune value equals to 1 in a small dynamic range compression rate scene, the first anchor point is not adjusted, and the first anchor point can be directly determined based on the first-order smoothing conditions for the first section and the second section of the curve.

Figure 5:
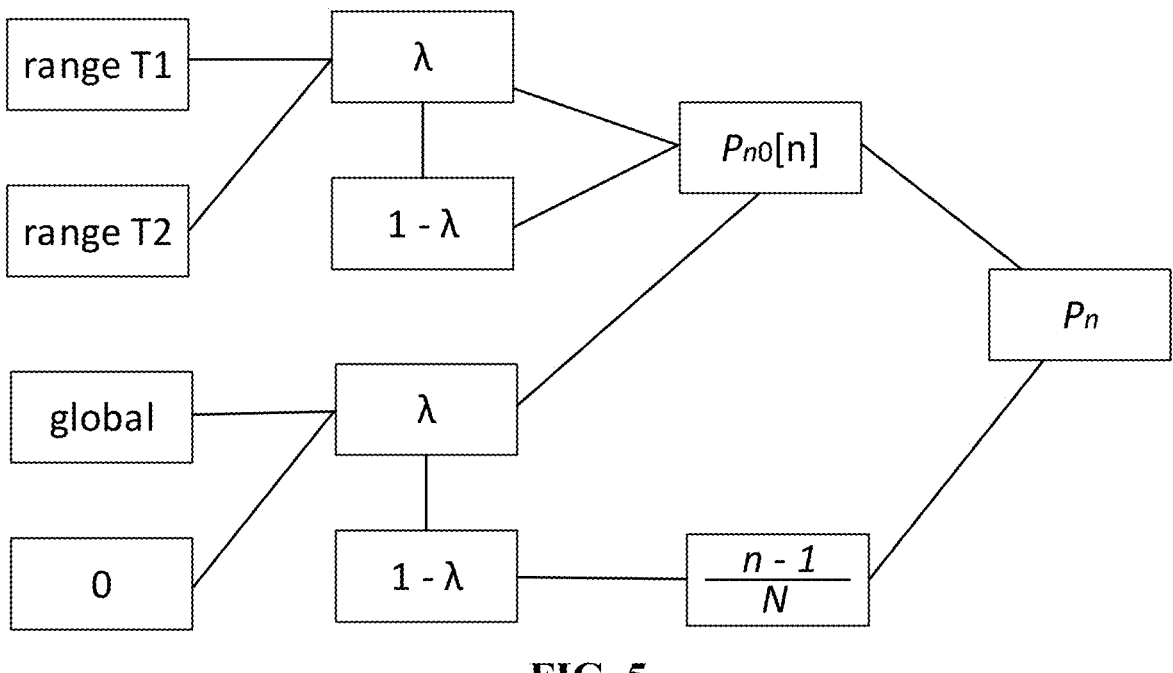
FIG. 5 is a schematic diagram illustrating a method for adjusting at least one third anchor point according to embodiments of the disclosure.

In the disclosure, the at least one third anchor point can be calculated as illustrated in FIG. 5. By initially setting a minimum value (denoted by "min") and a maximum value (denoted by "max") for the at least one third anchor point, an interpolation ratio is determined for performing an interpolation on the minimum value and the maximum value based on [T1, T2] where the mid tone is located, to determine an initial anchor point value $P_{\{n_o\}}$:

It is understandable that after calculating all the initial anchor points, the second anchor point needs to be fine-tuned in the same way as the first anchor point, to enhance the contrast in the luminance range of interest to the human eyes.

At block 204, the compression curve of each image frame in the video sequence is generated based on the control points.

In embodiments of the disclosure, the dynamic range compression curve includes two portions, one is the linear portion for maintaining the absolute luminance of the dark region, and the other is the nonlinear portion. The overall dynamic range compression is achieved by sacrificing the contrast of some regions and protecting or enhancing the contrast of the main part of the image. The two portions are connected through the knee point.

The process of calculating the parameters required for the compression curve is divided into the following three aspects:

(1) calculation of the knee point of the linear portion of the compression curve;

(2) calculation of the first anchor point and the second anchor point of the curve portion of the compression curve; and (3) calculation of at least one third anchor point (the remaining anchor points).

The overall idea is determining a respective range for each control point (such as the keen point, the first anchor point, the second anchor point, and each third anchor point) through two values. A linear interpolation value is determined for performing the linear interpolation on these two values based on the statistical information (in the mid tone or highlight region). After the linear interpolation, respective values of the control points are obtained to determine the whole compression curve. The expression of the whole curve is as follows:

$$
y = \begin{cases} \dfrac{K_y}{K_x}x, & 0 \le x \le K_x \\ K_y + (1 - K_y)B_N\left(\dfrac{x - K_x}{1 - K_x}\right), & K_x < x \le 1 \end{cases},
$$

in which, $B_N$ satisfies:

$$
B_N(t) = \sum\nolimits_{k=0}^{N}\binom{N}{k}t^k(1 - t)^{N-k}P_k,
$$

in which, $(K_x, K_y)$ denotes the coordinates of the knee point, $B_N$ denotes the Bezier curve, and $P_k$ denotes the first anchor point, the second anchor point, and each third anchor point of the Bezier curve.

At block 205, the control points are adjusted based on the overall compression ratio, the mid luminance information and adjustment ratios of each image frame in the video sequence.

In embodiments of the disclosure, the adjustment ratios includes a first adjustment ratio corresponding to the first control point (also called first anchor point), the first adjustment ratio corresponding to the first control point for each image frame in the video sequence is determined based on the knee point and the overall compression ratio, and the first control point is adjusted based on the first adjustment ratio and the mid luminance information.

In embodiments of the disclosure, the adjustment ratios includes a second adjustment ratio corresponding to the second control point (also called second anchor point), an interpolation ratio is calculated for the second control point of each image frame in the video sequence based on the overall compression ratio of each image frame in the video sequence; the second adjustment ratio corresponding to the second control point of each image frame in the video sequence based on the knee point, the interpolation ratio for the second control point and the overall compression ratio; and the second control point is adjusted based on the adjustment ratio for the second control point and the mid luminance information.

Figure 6:
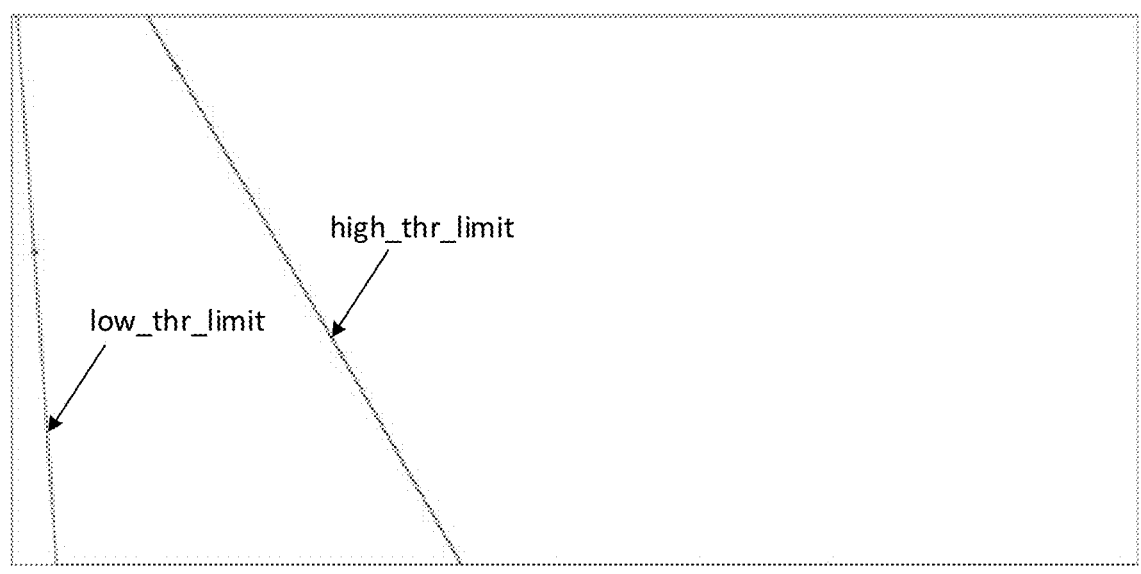
FIG. 6 is a schematic diagram illustrating an upper limit and a lower limit according to embodiments of the disclosure.

In detail, a compression ratio of the first anchor point is calculated through the constraint calculation of the first anchor point. Firstly, it is necessary to determine whether the scene involves a large-scale dynamic range compression. The judgment is based on the value of the vertical coordinate of the knee point of the straight line portion and the ratio of the preset target luminance to the reference luminance information. Since the value of the vertical coordinate of the knee point of the straight line portion satisfies a condition that the greater the mid tone, the smaller the vertical coordinate of the knee point of the straight line portion, the smaller the value of the linear portion is, the higher the luminance range where 50% of pixels in the image are located. The low_thr_limit can be set to represent the adjustment required for the first anchor point when the vertical coordinate of the knee point of the straight line portion is within the low luminance range [50 nit, 400 nit]. Meanwhile, the smaller the ratio of the preset target luminance to the reference luminance information is, the larger the dynamic range compression rate of the compression curve is. The high_thr_limit can be set to represent the adjustment needed when the compression rate is within a range [2.5, 8]. Finally, in combination with the relation between the mid tone and the overall luminance change, the range where the product of the low_thr_limit and the high-_thr_limit is located is determined, and then the adjustment ratio is determined for the first anchor point. FIG. 6 is a schematic diagram illustrating an upper limit and a lower limit according to embodiments of the disclosure. If the linear portion is large enough (that means the mid luminance value is small, and the luminance of 50% of pixels is on a relatively low luminance level), and the reference luminance value is smaller than the preset target luminance (that means the compression curve requires a small compression ratio), the calculated adjustment factor is 1, and the first anchor point does not need to be adjusted. The product of the high_thr_limit and the low_thr_limit represents the overall compression ratio of the first anchor point without breaking the continuity of the curve, and the overall value of the first anchor point is between 1/N+1 when the Bezier curve is a straight line and the first anchor point limit.

Figure 7:
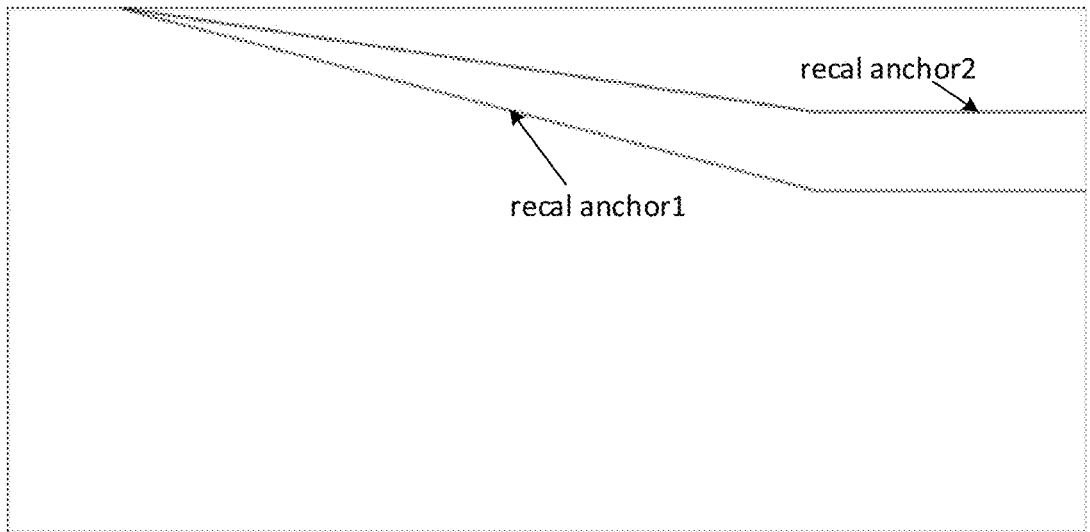
FIG. 7 is a schematic diagram illustrating an adjusted first anchor point and an adjusted second anchor point according to embodiments of the disclosure.

Since the first anchor point is compressed to a certain extent, the second anchor point also needs to be adjusted appropriately, to ensure that the contrast of the image area after the second anchor point, that is most concerned by the user, is enhanced. The adjustment method is similar to that for adjusting the first anchor point, but the overall adjustment magnitude is smaller than that of the first anchor point, to ensure that the contrast corresponding to the interval between the first anchor point and the second anchor point is not sacrificed too much, as illustrated in FIG. 7. The change between the slope at the first anchor point and the slope at the second anchor point can be properly adjusted and compressed, while enhancing the slope at the second anchor point and the subsequent connection point, thereby improving the contrast of the mid luminance information.

In embodiments of the disclosure, the adjustment ratios includes at least one third adjustment ratio corresponding to the at least one third control point (also call third anchor point), a respective third adjustment ratio is calculated for each third anchor point of each image frame in the video sequence is determined based on the overall compression ratio of each image frame in the video sequence; and each third anchor point is adjusted according to the third adjustment ratio. In detail, the first anchor point, the second anchor point and each third anchor point are adjusted according to the overall compression ratio in a global range [0, T]. Since in the extreme case that the dynamic range is not compressed and the Bezier curve is a straight line, the initial values of the first anchor point, the second anchor point and the at least one third anchor point are determined, and occupancy ratios in the final results (i.e., the adjustment ratios) are determined for the first anchor point, the second anchor point and the at least one third anchor point when the Bezier curve is a straight line, based on the value of the compression ratio. When the dynamic range compression ratio is small, the occupancy ratios for the first anchor point, the second anchor point and the at least one third anchor point when the Bezier curve is a straight line are large. In particular, the calculation result of the second anchor point requires the same processing and fine-tuning as the first anchor point.

At block 206, the shape of the compression curve of each image frame in the video sequence is determined based on the adjusted control points, and dynamic range compression is performed on each image frame in the video sequence.

Figure 8:
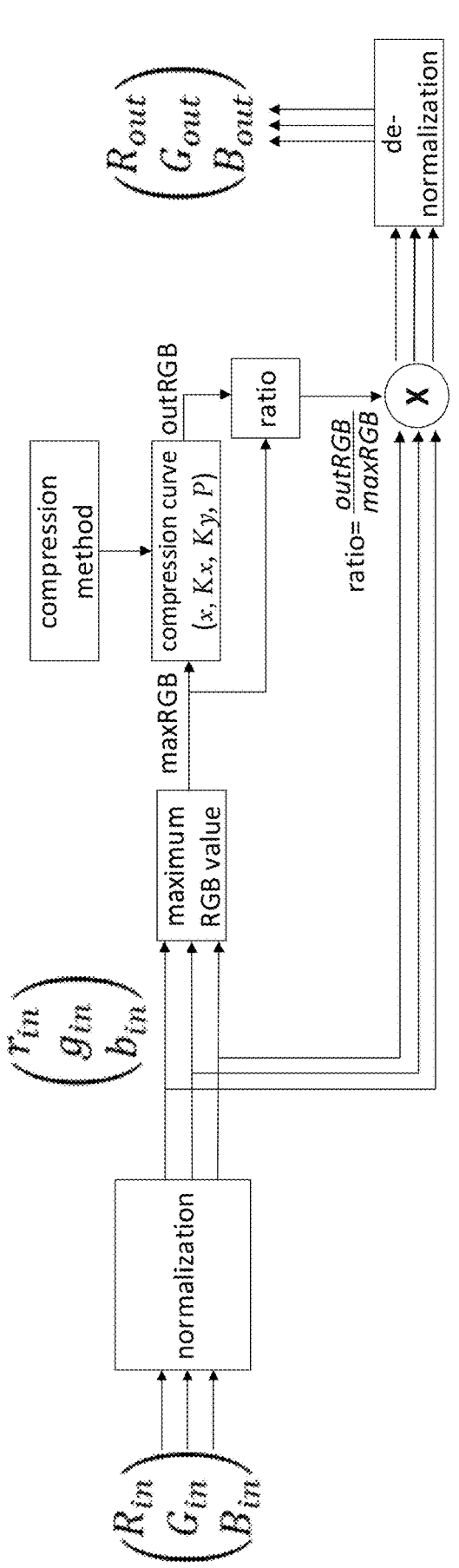
FIG. 8 is a schematic diagram illustrating a dynamic curve application method according to embodiments of the disclosure.

In embodiments of the disclosure, after a small amount of control information of the compression curve obtained from the camera side as illustrated in FIG. 8 is transferred in the form of metadata to the display side, if the target display luminance set at the camera side is consistent with that at the display side, the compression curve in the metadata can be directly applied to calculate the compression ratio of each pixel, to adjust the dynamic range.

In addition, in the disclosure, if the target display luminance is different from the luminance obtained at the display side in real time, the display side can pull up or extend the curve according to the real-time luminance.

Figure 9:
FIG. 9 is a schematic diagram of adjusting the dynamic range according to embodiments of the disclosure.

It is understandable that the "dynamic range compression" mentioned in the disclosure refers to compressing the actual luminance range (the unit is nit) of the source video toward the displayed luminance. During this process, the parameters need to be transferred are only the coordinate of the knee point of the linear portion, and the information of 9 anchor points of the Bezier curve. FIG. 9 is a schematic diagram of adjusting a dynamic range according to embodiments of the disclosure, which can display the bright region beyond the screen display capacity correctly and nicely on a specific display.

In conclusion, with the method according to embodiments of the disclosure, by establishing the relation between the luminance interval and the anchor points of the higher-order Bezier curve based on the rough histogram statistical information of the video sequence, the method can adaptively adjust the shape of the compression curve according to the source luminance distribution of each image frame of the video sequence, to adaptively compress or preserve the dynamic range of the HRD video source. Therefore, the dynamic range information of the whole video can be better transferred, and it is ensured that each frame can better show the bright and dark detail information. Meanwhile, the mid tone is enhanced to some extent, and the display performance is improved on the display side of high luminance (1000 nit and above). The encoding efficiency is increased since only a small amount of information is added to the video sequence to achieve the complete information transfer of the dynamic range compression curve. The transfer function PQ function can be applied well, which reduces the loss of dynamic range during coding transmission.

Figure 10:
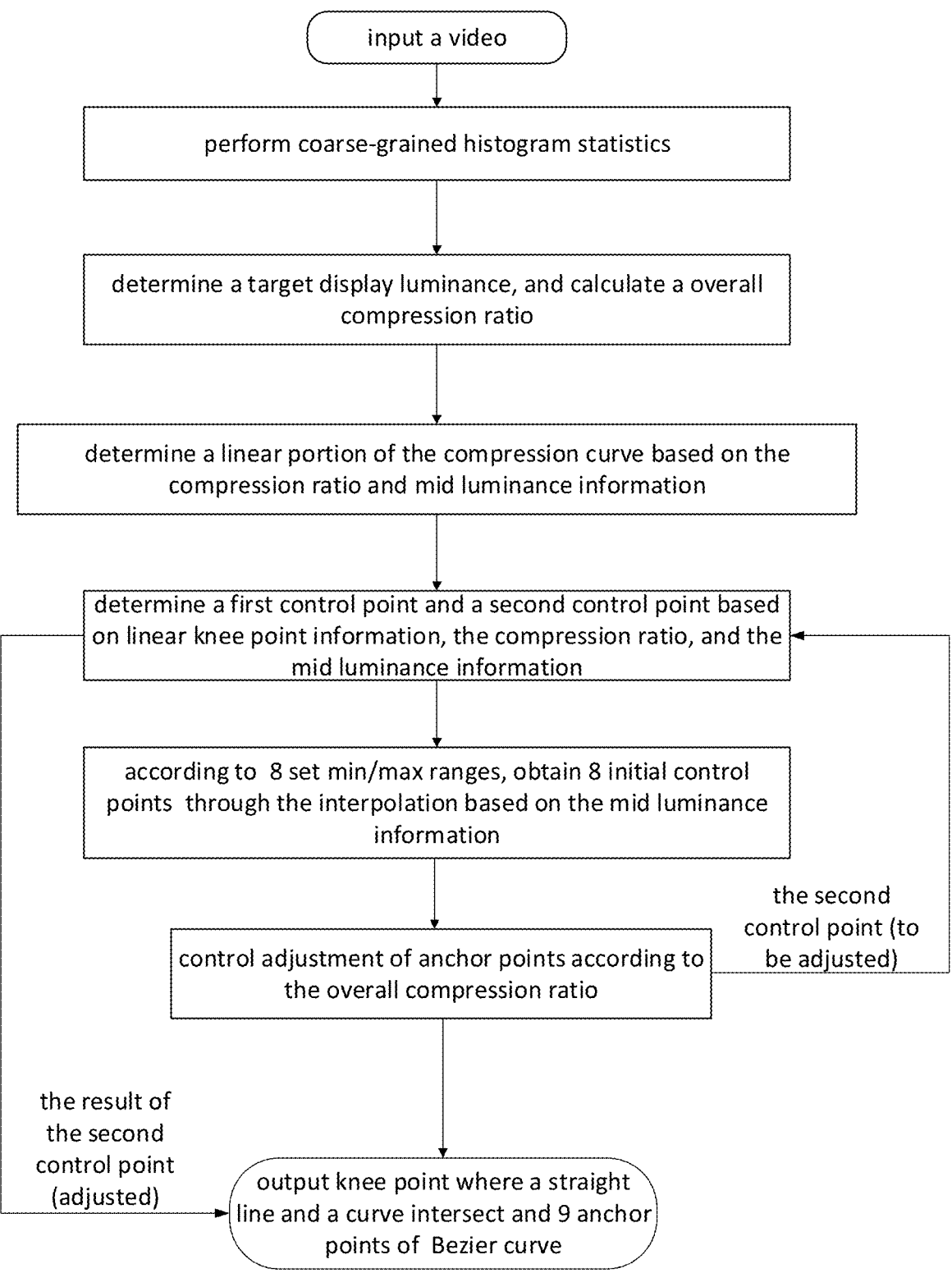
FIG. 10 is a flowchart illustrating a method for processing an image according to embodiments of the disclosure.

Based on the embodiments illustrated in FIGS. 1 and 2, FIG. 10 is a schematic diagram illustrating a method for processing an image according to embodiments of the disclosure.

In embodiments of the disclosure, by performing the histogram statistics on the video sequence frame by frame, the overall compression ratio is calculated based on the statistical information and the target display luminance. The control region of the knee point in the compression curve is determined based on the compression ratio and the mid luminance information, i.e., the first linear portion is determined. The first anchor point and the second anchor point are determined based on the information of the knee point, the overall compression ratio, and the mid luminance information. The eight initial anchor points are obtained through the interpolation based on the first anchor point, the preset threshold ranges of 8 anchor points, and the mid luminance information. The 8 initial anchor points include the second anchor point and the at least one third anchor point. Then, all anchor points are adjusted according to the interpolation ratio obtained by calculating based on the overall compression ratio.

It is understandable that after the interpolation ratio is calculated for the second anchor point based on the overall compression ratio, the second anchor point needs to be processed in the same way as the first anchor point, to obtain the adjusted second anchor point. The adjusted control points, i.e., the knee point of the straight line portion of the compression curve and the 9 anchor points of the curve portion of the compression curve, are output to achieve the dynamic range compression of the entire video sequence. FIG. 8 illustrates a method for compressing the dynamic range according to embodiments of the disclosure. The 9 anchor points of the compression curve are the first anchor point, the second anchor point, and 7 third anchor points.

In conclusion, the method can perform the dynamic range compression on the video frame by frame, which is suited for a scene (such as a bar) with large luminance changes and complex flickering light sources, to achieve good stability of dynamic range compression without luminance flickering and improve the representation of the creator's intent regardless of whether it is a frame with high or low luminance. Meanwhile, the dynamic range compression curve can be fully transferred through a very small number of parameters, with little impact on the video encoding efficiency, and can be adapted to a video that uses the PQ function as the transfer function, to achieve a small loss of dynamic range transfer after coding and encoding.

Figure 11:
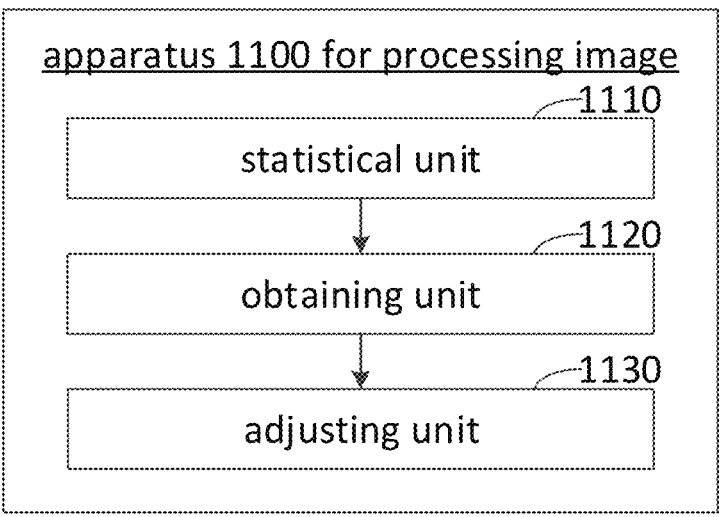
FIG. 11 is a schematic diagram illustrating an apparatus for processing an image according to embodiments of the disclosure.

FIG. 11 is a schematic diagram illustrating an apparatus for processing an image according to embodiments of the disclosure. As illustrated in FIG. 11, the apparatus 1100 includes: a statistical unit 1110, a determining unit 1120, an obtaining unit 1130, and an adjusting unit 1140. The apparatus 1100 performs the same processing on each image frame included in a video sequence, as follows.

The statistical unit 1110 is configured to obtain statistical information by performing histogram statistics on an image frame.

The determining unit 1120 is configured to determine an overall compression ratio of the image frame and mid luminance information of the image frame based on the statistical information.

The obtaining unit 1120 is configured to obtain a compression curve based on the overall compression ratio and the mid luminance information.

The adjusting unit 1130 is configured to perform dynamic range compression on the image frame by adjusting a shape of the compression curve based on the overall compression ratio, the mid luminance information and adjustment ratios.

In some embodiments, the statistical unit 1110 is configured to: smooth a histogram of each image frame in the video sequence, and determine a maximum RGB value of each pixel point and a nonlinear domain luminance in each frame image of the video sequence; and obtain the linear RGB values and the reference luminance information of each image frame in the video sequence by transferring the maximum RGB value of each pixel point and the nonlinear domain luminance into a linear domain and performing a cumulative histogram calculation.

In some embodiments, the obtaining unit 1130 is configured to: obtain, based on the overall compression ratio, the linear RGB values, the mid luminance information and the reference luminance information, control points of the compression curve of each image frame in the video sequence; and generate, based on the control points, the compression curve of each image frame in the video sequence.

In some embodiments, the control points include: a knee point, a first anchor point, a second anchor point and at least one third anchor point. The obtaining unit 1130 is configured to: determine, based on the mid luminance information and the overall compression ratio, the knee point of the compression curve of each image frame in the video sequence and a control region of the knee point; determine the first anchor point of each image frame in the video sequence based on the knee point, the control region of the knee point, and a preset adjustment value; and obtain the second anchor point and the at least one third anchor point of each image frame in the video sequence by interpolating based on the knee point, the mid luminance information, the overall compression ratio and a preset threshold range.

In some embodiments, the adjusting unit 1140 is configured to adjust the first anchor point, the second anchor point, and the at least one third anchor point based on the overall compression ratio, the mid luminance information and adjustment ratios of each image frame in the video sequence; and determine, based on the adjusted first anchor point, the adjusted second anchor point and the at least one adjusted third anchor point, the shape of the compression curve of each image frame in the video sequence, and performing dynamic range compression on each image frame in the video sequence.

In some embodiments, the adjustment ratios includes a first adjustment ratio corresponding to the first anchor point, the adjusting unit 1140 is configured to: determine, based on the knee point and the overall compression ratio, the first adjustment ratio corresponding to the first anchor point of each image frame in the video sequence; and adjust the first anchor point based on the first adjustment ratio corresponding to the first anchor point and the mid luminance information.

In some embodiments, the adjustment ratios includes a second adjustment ratio corresponding to the second anchor point, the adjusting unit 1140 is configured to: calculate, based on the overall compression ratio of each image frame in the video sequence, an interpolation ratio for the second anchor point of each image frame in the video sequence; determine, based on the knee point, the interpolation ratio for the second anchor point and the overall compression ratio, the second adjustment ratio corresponding to the second anchor point of each image frame in the video sequence; and adjust the second anchor point based on the second adjustment ratio corresponding to the second anchor point and the mid luminance information.

In some embodiments, the adjustment ratios includes at least one third adjustment ratio corresponding to the at least one third anchor points, the adjusting unit 1140 is configured to: calculate the at least one third adjustment ratio of the at least one third anchor point of each image frame in the video sequence based on the overall compression ratio and the mid luminance information of each image frame in the video sequence; and adjust the at least one third anchor point according to the at least one third adjustment ratio.

In some embodiments, the determining unit 1102 is configured to determine the overall compression ratio based on the reference luminance information and preset luminance information, and determine the mid luminance information based on the linear RGB values.

In conclusion, with the apparatus, the statistical information is obtained by performing histogram statistics on the video sequence frame by frame. Based on the statistical information, the compression curve of each image frame in the video sequence and the overall compression ratio are obtained. According to the overall compression ratio, the shape of the compression curve is adjusted, and dynamic range compression is performed for each image frame in the video sequence. Therefore, the shape of the compression curve can be adjusted adaptively according to each image frame in the video sequence, to transfer the dynamic range information of the entire video and ensure that each image frame can well represent the bright and dark detail information.

Corresponding to the method according to the above embodiments, the disclosure also provides an apparatus for processing an image. Since the apparatus according to embodiments of the disclosure corresponds to the method according to the above embodiments, the implementation of the method is also applicable to the apparatus according to the embodiments and will not be described in detail in the embodiments of the disclosure.

The method and apparatus according to the embodiments of the disclosure are described in the above embodiments provided by the disclosure. In order to implement each function in the method provided in the above-described embodiments of the disclosure, the electronic device may include a hardware structure, a software module, and implement each of the above-described functions in the form of hardware structure, software module, or a combination of hardware structure and software module. A function of the above functions can be performed in the form of hardware structure, software module, or a combination of hardware structure and software module.

Figure 12:
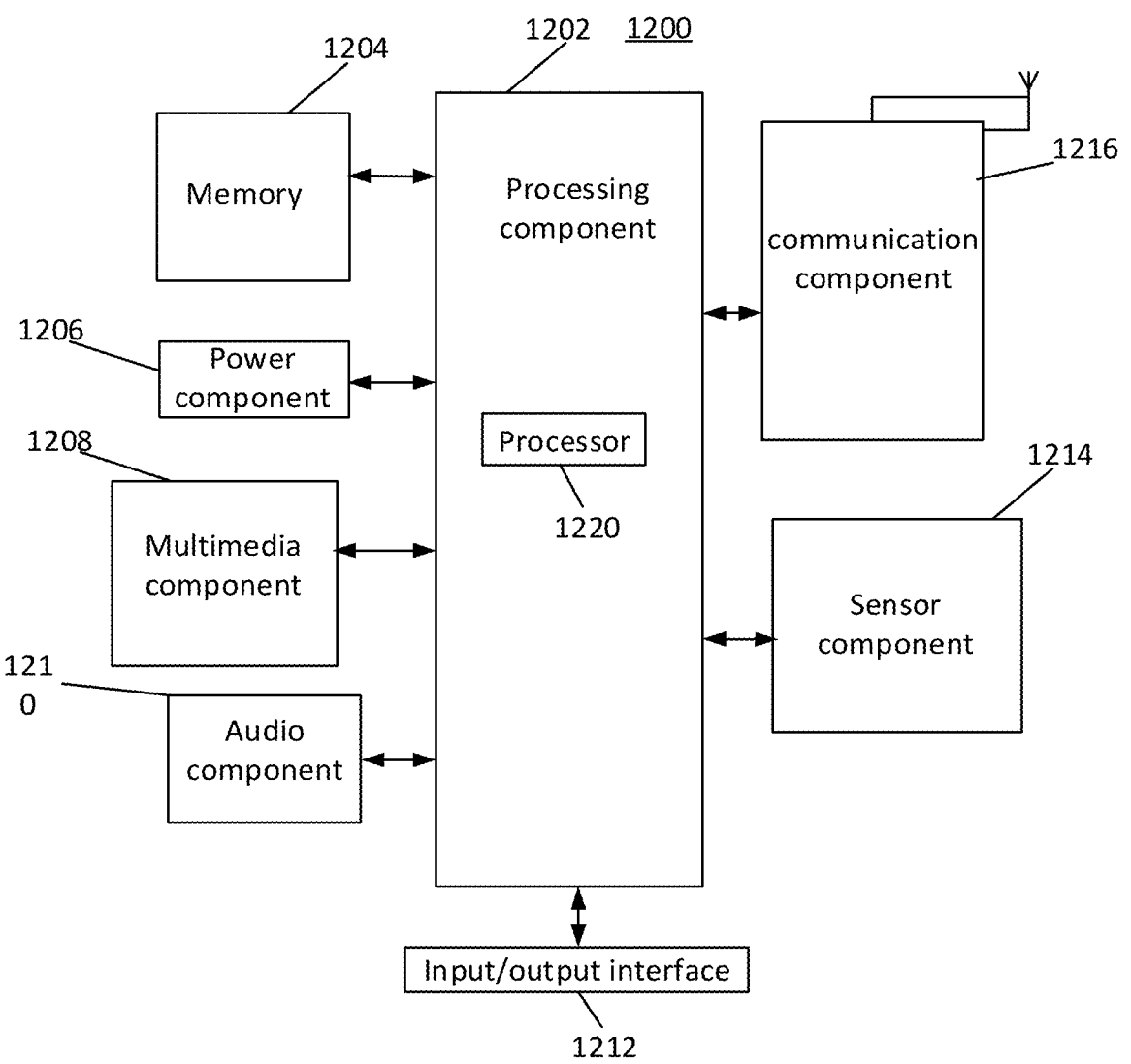
FIG. 12 is a schematic diagram illustrating an electronic device according to embodiments of the disclosure.

FIG. 12 is a block diagram of an electronic device 1200 for implementing the image processing method described above according to an exemplary embodiment. For example, the electronic device 1200 may be a mobile phone, a computer, a message transceiver device, a game console, a tablet device, a medical device, a fitness device and a personal digital assistant.

As illustrated in FIG. 12, the electronic device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the electronic device 1200, such as the operations associated with display, telephone calls, data communications, camera operations, and recording operations. The processing component 1202 may include one or more processors 1220 to perform all or part of the steps in the above described method. Moreover, the processing component 1202 may include one or more modules which facilitate the interaction between the processing component 1202 and other components. For example, the processing component 1202 may include a multimedia module to facilitate the interaction between the multimedia component 1208 and the processing component 1202.

The memory 1204 is configured to store various types of data to support the operation of the electronic device 1200. Examples of such data include instructions for any applications or methods operated on the electronic device 1200, contact data, phonebook data, messages, pictures, video, etc.

The memory 1204 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read-Only Memory (PROM), a Read Only Memory (ROM), a magnetic memory, a flash memory, a magnetic or optical disk.

The power component 1206 provides power to various components of the electronic device 1200. The power component 1206 may include a power management system, one or more power sources, and any other components associated with the generation, management, and distribution of power in the electronic device 1200.

The multimedia component 1208 includes a screen providing an output interface between the electronic device 1200 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front-facing camera and/or a rear-facing camera. When the electronic device 1200 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 1210 is configured to output and/or input audio signals. For example, the audio component 1210 includes a microphone (MIC) configured to receive an external audio signal when the electronic device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the electronic device 1200. For instance, the sensor component 1214 may detect an open/closed status of the electronic device 1200, relative positioning of components, e.g., the display and the keypad, of the electronic device 1200, a change in position of the electronic device 1200 or a component of the electronic device 1200, a presence or absence of user contact with the electronic device 1200, an orientation or an acceleration/deceleration of the electronic device 1200, and a change in temperature of the electronic device 1200. The sensor component 1214 may include a proximity sensor configured to detect the presence of nearby objects without any physical contact. The sensor component 1214 may also include a light sensor, such as a Complementary Metal Oxide Semiconductor (CMOS) or Charge-Coupled Device (CCD) image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the electronic device 1200 and other devices. The electronic device 1200 can access a wireless network based on a communication standard, such as WiFi, 2G or 3G, 4G LTE, 5G NR (New Radio) or a combination thereof. In an exemplary embodiment, the communication component 1216 receives a broadcast signal or broadcast associated information from an external broadcast management system via a broadcast channel. In an exemplary embodiment, the communication component 1216 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the exemplary embodiment, the electronic device 1200 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, micro-processors or other electronic components, for performing the above described method.

In the exemplary embodiments, there is also provided a non-transitory computer readable storage medium including instructions, such as the memory 1204, executable by the processor 1220 in the electronic device 1200, for performing the above method. For example, the non-transitory computer-readable storage medium may be a ROM, a Random Access Memory (RAM), a CD-ROM, a magnetic tape, a floppy disc, and an optical data storage device.

The embodiment of the disclosure also provides a non-transitory computer readable storage medium having computer instructions stored thereon. The computer instructions are configured to cause the computer to implement the image processing method described in the above-described embodiments of the disclosure.

The embodiment of the disclosure also provides a computer program product including computer programs. When the computer programs are executed by a processor, the image processing method described in the above-described embodiments of the disclosure is implemented.

The embodiment of the disclosure also provides a chip, including one or more interface circuits and one or more processors. The interface circuits are configured to receive signals from a memory of an electronic device and send the signals to the processors, and the signal includes computer instructions stored in the memory. When the processors execute the computer instructions, the electronic device is caused to implement the image processing method according to the above-described embodiments of the disclosure.

It should be noted that the terms "first", "second", etc. in the specification and claims of the disclosure and the accompanying drawings above are used to distinguish similar objects and do not need to be used to describe a particular order or sequence. It should be understood that the data so used may be interchanged, where appropriate, so that embodiments of the disclosure described herein can be implemented in an order other than those illustrated or described herein. The embodiments described in the following exemplary embodiments are not intended to represent all embodiments consistent with the disclosure. Rather, they are only examples of devices and methods that are consistent with some aspects of the disclosure, as detailed in the appended claims.

In the description of this specification, reference to the terms "an embodiment", "some embodiments", "schematic embodiments", "examples", "specific examples" or "some examples" means that the specific features, structures, materials or characteristics described in combination with the embodiments or examples are included in at least one embodiment or example of the disclosure. In this specification, the schematic representation of the above terms does not necessarily refer to the same embodiment or example. The specific features, structures, materials, or characteristics described may be combined in any one or more of the embodiments or examples in a suitable manner.

Any process or method described in a flowchart or described herein in other ways may be understood to include one or more modules, segments or portions of codes of executable instructions for achieving specific logical functions or steps in the process, and the scope of a preferred embodiment of the disclosure includes other implementations, which may be performed not in the order shown or discussed, including in a substantially simultaneous manner or in the reverse order, depending on the functions involved, as should be understood by those skilled in the art to which embodiments of the disclosure belong.

The logic and/or step described in other manners herein or shown in the flowchart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (control method) with one or more wires, a portable computer enclosure (a magnetic device), a RAM, a ROM, an EPROM or a flash memory, an optical fiber device and a portable CD-ROM. In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memory.

It should be understood that each part of the disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a Programmable Gate Array (PGA), a Field Programmable Gate Array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium. The storage medium mentioned above can be a ROM, a disk or a CD-ROM.

Although explanatory embodiments have been shown and described, it would be appreciated by those skilled in the art that the above embodiments cannot be construed to limit the disclosure, and changes, alternatives, and modifications can be made in the embodiments without departing from scope of the disclosure.

What is claimed is:

1. A method for processing an image, comprising: for each image frame included in a video sequence, obtaining statistical information by performing histogram statistics on an image frame;

determining an overall compression ratio of the image frame and mid luminance information of the image frame based on the statistical information, wherein the mid luminance information is luminance information of a luminance range near a middle part of a luminance histogram;

obtaining a compression curve based on the overall compression ratio and the mid luminance information, wherein obtaining the compression curve comprises:

determining a knee point for a linear region of the compression curve and determining a first anchor point, a second anchor point and at least one third anchor point for a non-linear region of the compression curve;

wherein determining the knee point comprises: determining a slope of the linear region based on the overall compression ratio, and obtaining the knee point by interpolating a predetermined maximum and a minimum value, wherein a interpolation ratio is negatively correlated with the mid luminance information;

wherein determining the first anchor point comprises: determining an initial first anchor point based on a smoothing condition of the linear region and the non-linear region; and adjusting the initial first anchor point using a first adjustment ratio;

wherein determining the second anchor point and at least one third anchor point includes: obtaining the an initial second anchor point and at least one initial third anchor point by interpolating a preset maximum value and a minimum value, wherein a interpolation ratio is determined according to the region from the maximum value to the minimum value into which the mid luminance information falls; and adjusting the initial second anchor point and the at least one initial third anchor point using the overall compression ratio; and performing dynamic range compression on the image frame by adjusting a shape of the compression curve based on the overall compression ratio, the mid luminance information and adjustment ratios.

2. The method of claim 1, wherein the statistical information comprises linear Red-Green-Blue (RGB) values and reference luminance information, and wherein obtaining the statistical information by performing histogram statistics on the image frame comprises:

smoothing a histogram of the image frame, and determining a maximum RGB value of each pixel point and a nonlinear domain luminance of the image frame; and obtaining the linear RGB values and the reference luminance information by transferring the maximum RGB value of each pixel point and the nonlinear domain luminance into a linear domain and performing a cumulative histogram calculation.

3. The method of claim 2, wherein determining the overall compression ratio and the mid luminance information based on the statistical information comprises:

obtaining the overall compression ratio based on the reference luminance information and a preset target luminance; and obtaining the mid luminance information based on the linear RGB values.

4. The method of claim 1, wherein the first adjustment ratio is determined to be: an adjustment ratio determined based on a corresponding adjustment required for the first anchor point when the knee point are within a low brightness region and a corresponding adjustment required for the first anchor point when the overall compression ratio is high.

5. The method of claim 1, wherein adjusting the initial second anchor point and the at least one initial third anchor point using an overall compression ratio comprises:

interpolating the values of the initial anchor point and the values of the anchor point when the nonlinear region is linearly distributed to obtain an adjusted control point, wherein the interpolation ratio is determined according to the overall compression ratio, and a occupancy ratios for the first anchor point, the second anchor point and the at least one third anchor point when the curve is a straight line are large when the overall compression ratio is smaller.

6. The method of claim 1, wherein determining the second anchor point further comprises:

adjusting the initial second control point using a second adjustment ratio that is smaller than the first adjustment ratio.

7. An electronic device, comprising:

at least one processor; and a memory communicatively connected to the at least one processor; wherein the memory stores instructions executable by the at least one processor, and when the instructions are executed by the at least one processor, the at least one processor is configured to: for each image frame included in a video sequence, obtain statistical information by performing histogram statistics on an image frame;

determine an overall compression ratio of the image frame and mid luminance information of the image frame based on the statistical information, wherein the mid luminance information is luminance information of a luminance range near a middle part of a luminance histogram;

obtain a compression curve based on the overall compression ratio and the mid luminance information, wherein obtain the compression curve comprises:

determining a knee point for a linear region of the compression curve and determining a first anchor point, a second anchor point and at least one third anchor point for a non-linear region of the compression curve;

wherein determining the knee point comprises: determining a slope of the linear region based on an overall compression ratio, and obtaining the knee point by interpolating a predetermined maximum and a minimum value, wherein a interpolation ratio is negatively correlated with the mid luminance information;

wherein determining the first anchor point comprises: determining an initial first anchor point based on a smoothing condition of the linear region and the non-linear region; and adjusting the initial first anchor point using a first adjustment ratio;

wherein determining the second anchor point and at least one third anchor point includes: obtaining the an initial second anchor point and at least one initial third anchor point by interpolating a preset maximum value and a minimum value, wherein a interpolation ratio is determined according to the region from the maximum value to the minimum value into which the mid luminance information falls; and adjusting the initial second anchor point and the at least one initial third anchor point using an overall compression ratio; and perform dynamic range compression on the image frame by adjusting a shape of the compression curve based on the overall compression ratio, the mid luminance information and adjustment ratios.

8. The electronic device of claim 7, wherein the at least one processor is configured to:

smooth a histogram of the image frame, and determining a maximum Red-Green-Blue (RGB) value of each pixel point and a nonlinear domain luminance of the image frame; and obtain linear RGB values and reference luminance information by transferring the maximum RGB value of each pixel point and the nonlinear domain luminance into a linear domain and performing a cumulative histogram calculation.

9. The electronic device of claim 8, wherein the at least one processor is configured to:

obtain the overall compression ratio based on the reference luminance information and a preset target luminance; and obtain the mid luminance information based on the linear RGB values.

10. The electronic device of claim 7, wherein the first adjustment ratio is determined to be: an adjustment ratio determined based on a corresponding adjustment required for the first anchor point when the knee point are within a low brightness region and a corresponding adjustment required for the first anchor point when the overall compression rate is high.

11. The electronic device of claim 7, wherein the at least one processor is further configured to:

interpolate the values of the initial anchor point and the values of the anchor point when the nonlinear region is linearly distributed to obtain an adjusted control point, wherein the interpolation ratio is determined according to the overall compression ratio, and occupancy ratios for the first anchor point, the second anchor point and the at least one third anchor point when the curve is a straight line are large when the overall compression ratio is smaller.

12. The electronic device of claim 7, wherein the at least one processor is further configured to:

adjust the initial second control point using a second adjustment ratio that is smaller than the first adjustment ratio.

13. A non-transitory computer-readable storage medium having computer instructions stored thereon, wherein the computer instructions are configured to cause a computer to implement a method for processing an image, the method comprising:

obtaining statistical information by performing histogram statistics on an image frame;

determining an overall compression ratio of the image frame and mid luminance information of the image frame based on the statistical information, wherein the mid luminance information is luminance information of a luminance range near a middle part of a luminance histogram;

obtaining a compression curve based on the overall compression ratio and the mid luminance information wherein obtaining the compression curve comprises:

determining a knee point for a linear region of the compression curve and determining a first anchor point, a second anchor point and at least one third anchor point for a non-linear region of the compression curve;

wherein determining the knee point comprises: determining a slope of the linear region based on an overall compression ratio, and obtaining the knee point by interpolating a predetermined maximum and a minimum value, wherein a interpolation ratio is negatively correlated with the mid luminance information;

wherein determining the first anchor point comprises: determining an initial first anchor point based on a smoothing condition of the linear region and the non-linear region; and adjusting the initial first anchor point using a first adjustment ratio;

wherein determining the second anchor point and at least one third anchor point includes: obtaining the an initial second anchor point and at least one initial third anchor point by interpolating a preset maximum value and a minimum value, wherein a interpolation ratio is determined according to the region from the maximum value to the minimum value into which the mid luminance information falls; and adjusting the initial second anchor point and the at least one initial third anchor point using an overall compression ratio; and performing dynamic range compression on the image frame by adjusting a shape of the compression curve based on the overall compression ratio, the mid luminance information and adjustment ratios.

* * * * *